United States Patent [19]
Trischuk

[11] 3,763,603
[45] Oct. 9, 1973

[54] ALUMINUM OXIDE PRESSURE BLASTING ABRASIVES AND METHOD OF MAKING

[75] Inventor: Ronald W. Trischuk, Niagara Falls, Canada

[73] Assignee: Norton Company, Worcester, Mass.

[22] Filed: Apr. 16, 1971

[21] Appl. No.: 134,803

[52] U.S. Cl.............. 51/319, 51/308, 51/309, 106/65
[51] Int. Cl............. B24c 1/04, B24c 1/10
[58] Field of Search............ 51/293, 309, 308, 51/319, 320; 23/191; 106/43, 69, 57; 264/15, 332

[56] References Cited
UNITED STATES PATENTS

| | | | |
|---|---|---|---|
| 2,261,639 | 11/1941 | Benner et al. | 161/168 |
| 3,571,985 | 3/1971 | Hulbert | 51/319 |
| 3,675,373 | 7/1972 | Putnam | 51/319 |
| 2,924,533 | 2/1960 | McMullen | 106/57 |
| 3,323,888 | 6/1967 | Searight et al. | 264/15 |
| 1,192,709 | 7/1916 | Tone | 51/309 |
| 3,070,420 | 12/1962 | White et al. | 264/15 |
| 1,524,134 | 1/1925 | Hutchins | 51/309 |
| 1,894,208 | 1/1933 | Girsewald | 51/309 |
| 3,428,443 | 2/1969 | Davis | 51/309 |
| 1,268,532 | 6/1918 | Allen | 51/309 |
| 3,155,466 | 11/1964 | Grutter et al. | 51/307 |
| 2,000,857 | 5/1935 | Masin | 51/309 |

Primary Examiner—Donald J. Arnold
Attorney—Allan R. Redrow

[57] ABSTRACT

An improved pressure blasting product adapted for cleaning and peening operations in general but having a particular use in a method of shot peening objects made of aluminum. A substantially solid sphere of a refractory oxide material is formed that is adapted to be blasted against the object to be cleaned or tempered, preferably the sphere is a bauxite material that has been fused and subsequently solidified by air quenching to produce small spheres each having a microcrystalline structure, the spheres all being substantially solid.

8 Claims, 2 Drawing Figures

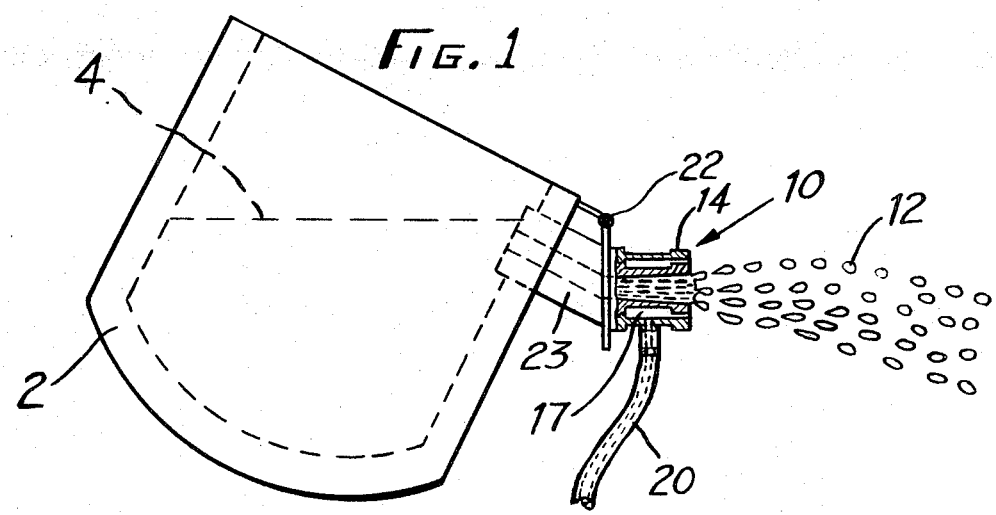
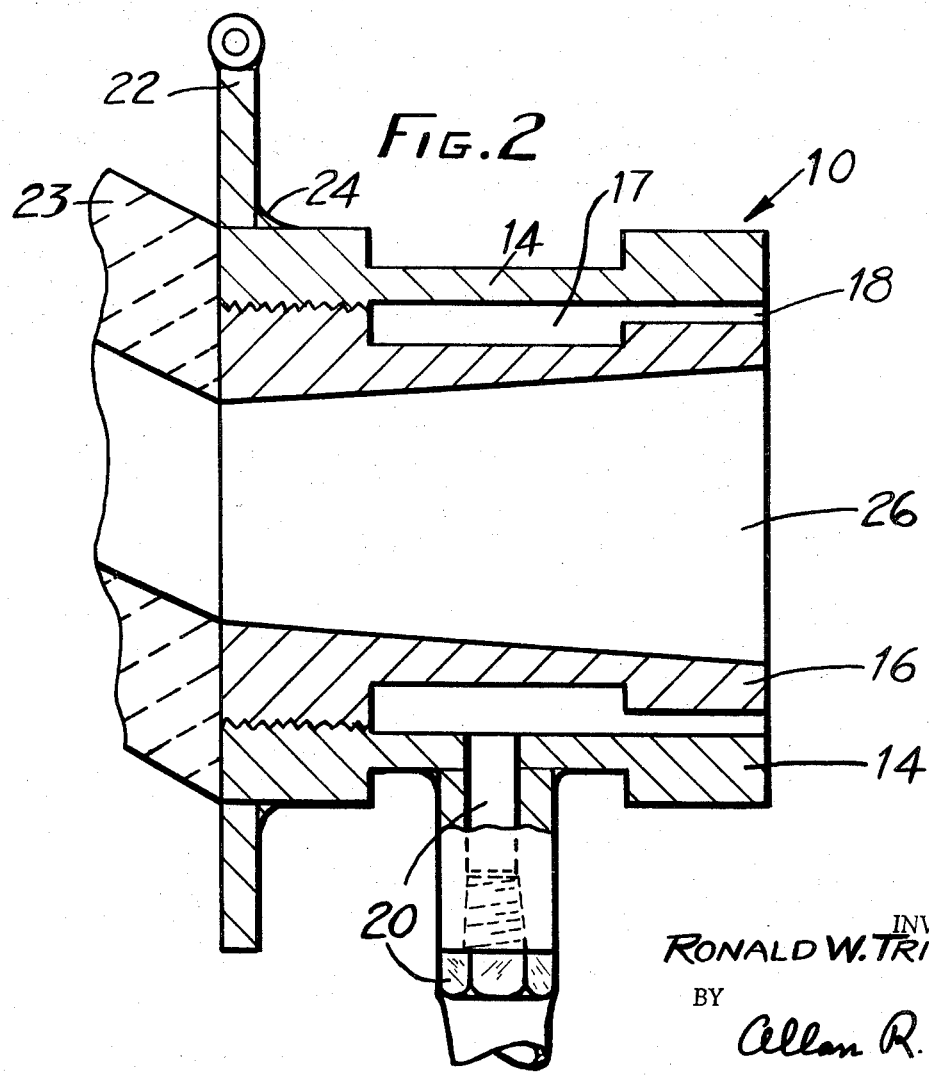

ALUMINUM OXIDE PRESSURE BLASTING ABRASIVES AND METHOD OF MAKING

BACKGROUND OF THE INVENTION

It has been conventional practice to shot peen aluminum forgings and the aluminum skin on all aircraft constructions. Heretofore glass beads have been used for this purpose. While it has been known that steel balls can be used for shot peening, it has been found that the steel balls sometimes contaminate the aluminum used in the aircraft production such that it has been impossible to use the more durable steel balls for this purpose. Also the heavier steel and other metal spheres cannot be used where thin elements must be peened. It has been found in practice that the glass beads which are now used where steel and other metal balls cannot be used, do not endure for any substantial length of time and as the glass beads break up reclamation of the usable beads and recirculation becomes difficult and also the finish on the article being peened with some of the broken glass beads may not be the best.

The present invention in its preferred form, provides a product for shot peening aluminum, the shot material taking the form of substantially solid pellets that may be formed by freezing molten bauxite into small solid spheres. The spheres of bauxite are adapted to be entrained in an air stream or mechanically driven to be impinged against the surface to be treated. It has been found that the bauxite spheres are quite durable so that the intensity of the shot peening action can be maintained more easily as compared with glass beads normally used for this purpose. As compared with steel balls, that are sometimes used in other shot peening operations, bauxite beads or spheres may be used without the possibility of contaminating aluminum surfaces which contamination is nearly always encountered when steel balls have been stored for some time or are used in a wet operation against aluminum to temper the aluminum product.

Peening processes generally fall into two general categories. In one of these processes, the stream peening medium is propelled by means of a high velocity stream of gas, usually air. The other widely used method is mechanical, whereby the peening medium is propelled by the centrifugal force created when the peening material is fed to the hub of a rotating wheel which has radial vanes or paddles. More recently it has been found desirable for peening certain structures, e.g. aluminum aircraft skin, to utilize only that peening energy which is created by the force of gravity on the peening material as it is allowed to fall through space to ultimately impact the surface of the part being treated.

The present invention relates to the various peening processes which fall within the foregoing categories.

BRIEF DESCRIPTION OF THE INVENTION

A known bauxite material is rendered molten, usually at 1700°–2100°C, in a conventional arc furnace used for casting operations, and without refining the molten bauxite, it is poured from the tap of the furnace to flow through an aspirator type air quenching nozzle so that the molten material is atomized and formed into droplets and the droplets frozen to substantially solid form in the chilled air stream as the particles or droplets flow from the nozzle. When particles of molten bauxite are solidified in this manner a given range of sphere sizes is always produced when using any particular nozzle structure and depending upon the air pressure used a preponderance of either smaller or larger spheres within that range results. In accordance with my invention substantially solid bauxite spheres are desired, falling within the range of 60 mesh or finer on either the Tyler or U.S. Standard Sieve Series. These beads of solidified bauxite will be found to have a substantially uniform outer appearance and almost the original composition of the starting bauxite material. Beads of bauxite within the size range of approximately 40 to 60 mesh and especially in the finer sizes have been found to be extremely useful for shot peening aluminum and other very thin metal objects. The beads of bauxite do not contaminate the aluminum as sometimes happens when conventional steel balls are used which nearly always have some rust on their surfaces and it has been found as compared with glass beads normally used for peening aluminum and thin objects that the bauxite beads do not break down nearly as rapidly in use, so that the intensity of the peening action in comparison with glass beads, can be more easily maintained. The bauxite beads may be recirculated in the shot peening operation substantially as are steel balls. However when glass beads are used, broken pieces of some of the glass beads which quickly build up to an objectionable degree in any charge of such beads being recirculated, present a problem.

BRIEF DESCRIPTION OF THE DRAWINGS

FIG. 1 is a vertical section showing in diagrammatic form a fusion casting furnace having an air driven aspirator nozzle at its tap for atomizing a molten refractory oxide material; and FIG. 2 is an enlarged vertical cross-section of the atomizing aspirating air nozzle shown in FIG. 1.

DETAILED DESCRIPTION OF THE INVENTION

For the purposes of this invention any conventional chilling means may be used that is adapted to produce small sized spheres of solid material. To produce solid beads from molten bauxite I prefer to use the apparatus shown in FIGS. 1 and 2. It has been found that in air quenching any of the commonly known mineral ores used for the production of abrasive materials that the viscosity of the melt, surface energy, solidification temperature range and the degree of super heat present in the molten mass, all have an effect. For any molten material and any given set of conditions it will be found that a given range of different sized beads is produced when the molten material is atomized and frozen by processing the material through any given aspirator type air quenching nozzle such as illustrated in FIG. 2. When such a nozzle is used, although different degrees of air pressure may be supplied to the nozzle to atomize and quench the molten material, all of the spheres produced will fall within the given range of particle sizes, but it has also been found that the percentage of any particular larger or smaller sizes of beads within the entire given range of sizes can be varied. When a higher air pressure is used in the nozzle for quenching any given fused material, a larger percentage of smaller sized beads results, whereas, in contrast, when a lower air pressure is used in the aspirator nozzle, more of the larger sized beads within the overall range of sizes, are produced. It has been further observed that regardless of whether a lower or higher degree of air pressure is used, more of the larger sized beads produced tend to each have a closed more or less centrally disposed pore therein. With a proper selection, of the degree of air pressure used to produce the spheres from molten bauxite for example, more or less of the larger or smaller spheres within the given size range can be produced, the resulting product having more or less voids therein with the number of spheres with voids therein generally diminishing as the size of the beads becomes smaller. Usually even when smaller hollow spheres are made, it has been found that they tend to have relatively thicker walls and in the finer sizes the spheres are usually solid.

I prefer to use a higher pressure to produce the predominately smaller sized and generally solid spheres for use in a shot peening operation. When such spheres are made of molten bauxite in accordance with the present invention, I adjust my air pressure in the nozzle to fall in the range of from 70 to 100 p.s.i. in the aspirator type nozzle shown and even higher pressures are suggested for use. When a blowing pressure within the 70 to 100 p.s.i. range is used with a molten bauxite composition, it will be found that spheres predominately in the size range of 60 mesh and finer on either the Tyler or U. S. Standard Sieve Series will be produced. There will be some hollow spheres larger than the 40 to 50 mesh range and a mixture of spheres having smaller voids but mostly substantially solid spheres within the 50 to 60 mesh size. There will be some percentage of 60 to 70 mesh beads that have still smaller voids in the center but from 70 mesh and finer on down to 200 to 250 mesh, the beads will be found to be substantially all solid spheres.

I have had the porosity of various sizes of spheres measured using the air pycnometer method. The percent of closed porosity in the solid volume of the spheres based on the data collected from different runs using two different sources of bauxite is as follows:

|  | 36 Grit | 70 Grit | 150 Grit |
|---|---|---|---|
| For Surinam Bauxite | 1.3% | 0% | 0.5% |
| Arkansas Bauxite | 0.8% | 1.0% | 0.3% |

This porosity characteristic of my grain was also investigated by a cruder method making use of light transmitted through grits 150 and finer on the Tyler screen. Larger grits can be sectioned for microscopic examination. The data observed in such methods of optical observation indicates the following:

Estimate % Spheres with Central Voids

|  | 36 Grit | 70 Grit | 150 Grit | 220 Grit |
|---|---|---|---|---|
| For Surinam Bauxite | 85 | 75 | 40 | 20 |
| Arkansas Bauxite | 80 | 60 | 25 | 10-15 |

Insofar as it can be estimated by an experienced microscopist, the central pores or voids in the spheres, when present, generally range from about ¼ to ⅛ the diameter of the sphere. At the maximum void dimension, namely ¼ the diameter, the void would represent about 1/64 the total volume of the sphere.

On the basis of the data collected to date, I estimate that in the beads I have produced roughly in the range of from 36 grit to 70 grit Tyler, the porosity ranges from approximately less than from 2 to 1 percent, in the range of 70 grit to 150 grit less than 1 percent to about 0.5–0.6 percent, and in the range of 150 grit and finer less than 0.6 percent.

Beads made from fused Arkansas and fused Surinam bauxite were microscopically examined using standard petrographic methods. In transmitted light beads 150 mesh (and finer) were transparent and were examined intact. The coarser beads, on the other hand, had to be crushed to a powder to be studied because intact they were too thick to be transparent. For all mesh sizes investigated, the microtexture was extremely fine. The following table lists the maximum aluminum oxide crystal size observed in each mesh size and the estimated average aluminum oxide crystal size in each mesh size.

| Mesh size | Crystal Size in Microns | | | |
|---|---|---|---|---|
|  | 36 | 70 | 100 | 150 |
| Maximum | 10 | 4 to 5 | 3 | submicron |
| Estimated Average | 2 to 3 | 1 to 2 | 1 | submicron |

For shot peening operations I find that generally the more solid spheres of fused bauxite in the finer size ranges have a particularly useful life for blast cleaning and peening, the bauxite spheres being especially useful for peening articles made of aluminum and for peening thin objects that might be deformed by the heavier metal spheres. A particular attribute of my spheres is their ability to maintain a relatively long life as compared to the conventional glass beads used in an aluminum peening operation, with much less complication in maintenance of a relatively constant peening intensity as measured with any of the standard Almen strip tests which are described beginning on page 14 in the SAE Manual on Shot Peening SAE J808a, as revised November, 1967.

To make spheres for my purpose with the apparatus in FIG. 1, fused and molten refractory oxide material 4 such as a molten bauxite is poured from a standard water cooled casting shell 2 forming part of an arc furnace through an aspirator type compressed air nozzle 10 to form the flowing molten stream into individual masses or particles 12.

In FIG. 2 the air nozzle 10 is shown in detail. The outside casing 14 is arranged concentrically with the inner conduit element 16, the outer surface of the conduit 16 being configured to cooperate with the inner wall of casing 14 to provide an air chamber 17 having an orifice 18 at the outer end of the nozzle from which compressed air fed into chamber 17 exits. Compressed air is delivered to the chamber by infeed 20. The aspirator type air nozzle 10 is attached to the outer wall of furnace 2 by being carried on a hinge 22 supported on the outside furnace wall so that the nozzle can be positioned in front of tap 23 in use or raised from in front of the tap or pouring outlet 23 for ease of cleaning. As shown in FIG. 1 the nozzle normally bears flush against the inclined outer end of the pouring tap 23 and during a normal pouring cycle the nozzle is held closed against the tap with a suitable latch if needed or simply by the reaction of the air stream issuing from outlet 18 as it blows against the molten fluid flow. When the pouring cycle begins, the nozzle is directly slightly above the horizontal and as the pour is completed, it sweeps in a short arc from its original position to be pointed somewhat downwardly from the horizontal toward the floor or collecting means onto which the solidified particles fall.

Fused and molten material flows to the tap 23 and exits through the center passage 26 in the aspirator nozzle. In one apparatus I have used for air quenching fused bauxite, the passage 26 had a diameter of 1 ½ inches at its inner end, the passage gently opening outwardly by means of a conical wall surface to a diameter of 2 inches at its exit end for exhausting the fluid flow of molten bauxite into the expanding air quenching stream issuing from orifice 18 which surrounds the exit end of passage 26. The orifice 18 had a width of 3/32 inch in the particular embodiment I used for air quenching molten bauxite, the nozzle being fabricated of steel, but other metals or refractory materials could be used.

Air at a pressure of 80 to 100 p.s.i. was fed to chamber 17 to issue from orifice 18 to assist the fluid flow through the tap whereby to aspirate the molten bauxite from the flow passage 26 of the nozzle in order to atomize the fluid and effect chilling and ultimate solidification of the atomized bauxite particles.

The bauxite particles will be found to be generally well rounded and substantially spherical in shape. They have an impact strength greater than that of glass beads and a specific gravity intermediate glass and steel beads i.e. from approximately 3.80 to 3.97 g/cc. Further the fused bauxite particles are very inert chemically. In tests comparing my product with glass beads in Almen strip tests, the following data were recorded.

Bead Size: Military Grade Size 10 per Gov't. Spec. MIL-G-9954A. (80%–100% of particles ranging in size of from 0.0059 to 0.0035 inch)

Results

New Beads:

| | Intensity (inches) | | | | | |
|---|---|---|---|---|---|---|
| | "A" Strip | | "N" Strip | | Finish RMS | |
| Pressure p.s.i. | glass | bauxite | glass | bauxite | glass | bauxite |
| 30 | .002 | .0021 | .006 | .006 | 20 | 27 |
| 50 | .0039 | .0033 | .0097 | .0095 | 32 | 47 |
| 70 | .005 | .004 | .0122 | .012 | 46 | 60 |
| After use: | | | | | | |
| 30 | .002 | .002 | .0061 | .006 | 22 | |
| 50 | .0028 | .003 | .0077 | | 29 | 45 |
| 70 | .0033 | .004 | .0093 | .0103 | 39 | 55 |

Consumption, based on a 20 pound starter load

| Pressure p.s.i. | Glass | Bauxite |
|---|---|---|
| 30 | 3#/hr. | |
| 50 | 4#/hr. | |
| 70 | 6#/hr. | 2#/hr. |

The above data show that where measured, my beads gave an equally good intensity for peening action as compared to glass beads. Because of the superior particle strength of my material there is considerably less breakdown of the beads so that there is less waste of material and fewer problems associated with its use in a recirculating system.

It is preferred that the molten bauxite be converted to spheres without any noticeable reduction in the normal impurities present in the bauxite. Further, the Arkansas and Surinam bauxite sources that I have used are improved by the addition of as much as 2 to about 12 percent by weight of $SiO_2$ which is a normal bauxite impurity.

EXAMPLE I

Surinam bauxite was used to make spheres according to the invention. The specific quantity of Surinam bauxite used was not analyzed chemically but bauxite from this source consistently has a chemical composition within the following approximate weight-percent range:

| | Wt.% |
|---|---|
| Loss on Ignition | 0.48–1.33 |
| $H_2O$ | 0.40–1.10 |
| $SiO_2$ | 2.60–3.82 |
| $Fe_2O_3$ | 3.86–5.47 |
| $TiO_2$ | 3.02–4.09 |
| $Al_2O_3$ | 85.46–89.02 |

The bauxite was rendered molten in a tapping type arc furnace, and poured directly from the furnace through an atomizing nozzle like that shown in FIG. 2. The air pressure applied was maintained between 80 and 100 pounds per square inch, which caused the molten bauxite exiting from the mouth of the nozzle to atomize or form droplets which were frozen to substantially solid form and collected.

The frozen particulate product was then screened to fractionate and collect those particles that would pass through a 65 and collect on an 80 mesh screen (70 mesh), and those that would pass through a 150 and collect on a 170 mesh screen (150 mesh) (Tyler Sieve Series). These two mesh size fractions were then subjected to strength tests whereby the resistance of the beads or particles to destruction by high velocity impact, was measured. The impact test procedure employed was that described by J. M. Karpinski and R. O. Tervo in their paper entitled "Single Impact Testing of Brittle Materials," published in the June 1964 issue of Society of Mining Engineers Transactions at pages 126 through 130. The impact strength of the material is indicated by the exponential $r$ and is inversely proportional thereto, i.e. the smaller the value of $r$, the proportionally greater is the impact strength.

The impact strengths of the above fractions of the invention beads, as compared to glass beads, was as follows:

| | $r$ Value (Paddle Speed 3000 r.p.m.) | |
|---|---|---|
| Bead Material | 70 Mesh | 150 Mesh |
| glass | 0.33 | 0.14 |
| bauxite (Surinam) | 0.20 | 0.026 |

The magnitude of the greater strength of the beads of the present invention is obvious from the foregoing $r$ values.

EXAMPLE II

Bauxite beads, 70 and 150 mesh, were fabricated, separated, and impact tested in the same manner as described in Example I. Here however, the bauxite used was Arkansas bauxite. The specific powder used was not chemically analyzed but Arkansas bauxite consistently falls within the following approximate compositional range:

| | wt.% |
|---|---|
| Loss on Ignition | 0.29–0.83 |
| $H_2O$ | 0.28–1.43 |
| $SiO_2$ | 3.94–4.44 |
| $Fe_2O_3$ | 4.84–5.54 |
| $TiO_2$ | 2.43–2.91 |
| $Al_2O_3$ | 86.15–87.54 |

The impact test results of the invention beads, as compared to glass beads, were as follows:

| | $r$ Value (Paddle Speed 3000 r.p.m.) | |
|---|---|---|
| Bead Material | 70 Mesh | 150 mesh |
| Glass | 0.33 | 0.14 |
| bauxite (Arkansas) | 0.14 | 0.016 |

The superiority of the invention beads is conspicuous in the vastly lower *r* values as compared to the *r* values for the glass beads.

EXAMPLE III

Bauxite beads, 70 and 150 mesh, were made, separated, and impact tested in the same manner as set forth in Example I. Here the bauxite used was Arkansas bauxite to which had been added 4 percent by weight of silica having been admixed with the molten Arkansas bauxite.

The impact test results of the beads, as compared to glass beads, were as follows:

| Bead Material | *r* Value (Paddle speed 3000 r.p.m.) | |
| --- | --- | --- |
| | 70 Mesh | 150 Mesh |
| glass | 0.33 | 0.14 |
| bauxite (Arkansas +4% $SiO_2$) | 0.09 | 0.015 |

EXAMPLE IV

Bauxite beads, 70 mesh, were made, separated, and impact tested in the same manner as set forth in Example I. Here the bauxite used was Surinam to which added about 12 percent by weight of silica was added to the molten mass. The impact test results of the beads, as compared to glass beads, and to beads made from bauxite alone, are as follows:

| Bead Material | *r* Value (Paddle speed 300 r.p.m.) 70 Mesh |
| --- | --- |
| glass | 0.33 |
| bauxite (Surinam) | 0.20 |
| bauxite (Surinam + 12% $SiO_2$) | 0.04 |

The impact strength of the invention beads comprised of bauxite to which 4 to 12 percent silica had been added is superior to either the straight bauxite beads of Example II or the Surinam bauxite beads of Example I and has greatly increased impact strength as compared with glass beads.

In using the fused spherical product described above it will be found that the shape of the frozen product is ideal for the air or mechanical type of shot peening operations. The use of fused bauxite spheres particularly for shot peening aluminum products has been described.

Incidental to its use for shot peening, the solidified bauxite spheres also serve to blast clean the article and because of their extreme durability when properly used in such peening and cleaning operations, it has been found to be economical to recover and to recirculate the spheres for reuse whereas most of the other conventional blasting abrasives with the exception of metal beads must be disposed of after limited blast peening or cleaning operations.

The above description covers the preferred form of my invention and its use. Many other embodiments of the present inventions may occur to those skilled in the art which will fall within the scope of the following claims.

What is claimed is:

1. A charge of substantially spherically shaped grains for use in shot peening, each of said grains comprising an essentially solid mass of fused bauxite all of said solid spheres being of such a size as to pass through a 60 mesh Tyler Sieve Series screen, and said spheres all having a microcrystalline structure wherein the approximate average size of the crystals is 5 microns or less.

2. Product as in claim 1 wherein the solid material in each of the several grits has a homogeneous composition throughout its mass.

3. Product as in claim 1 formed from a batch of molten Surinam bauxite.

4. Product as in claim 1 formed from a batch of molten Arkansas bauxite.

5. Product as in claim 1 formed from a batch of molten Surinam bauxite and wherein the solid material of all of the grains is of substantially the same density and has a homogeneous composition.

6. Product as in claim 1 formed of Arkansas bauxite and wherein the solid material of all of the grains is of substantially the same density and has a homogeneous composition.

7. Product as described in claim 1 wherein the grains are formed from fused bauxite having from 2 to 12 percent by weight of silica added to the fusion.

8. A method of shot peening a metal object wherein the surface being peened contains a predominant content of aluminum, comprising directing a stream of solid spheres that are 60 mesh and finer against the surface to be peened, said spheres having been formed principally from a molten bauxite without reducing its natural impurities and being of such a size as to pass through a 60 mesh Tyler screen, and forcibly driving the spheres forming said stream against the aluminum containing surface to be peened.

* * * * *